July 18, 1950  W. H. SHORTELL  2,516,079

TENSIONING DEVICE FOR HACKSAW BLADES

Filed May 18, 1946

INVENTOR
WILLIAM H. SHORTELL
BY
Frederick P. Warfield
ATTORNEY

UNITED STATES PATENT OFFICE 2,516,079

TENSIONING DEVICE FOR HACKSAW BLADES

William H. Shortell, Greenfield, Mass., assignor to Millers Falls Company, Greenfield, Mass., a corporation of Massachusetts Application May 18, 1946, Serial No. 670,802

1 Claim. (Cl. 29—73)

This invention relates to tension control for hack saw blades.

The object of the invention is to provide simple and efficient means to control the reactive effect of the tension spring in a device in which a resilient graduated tension is imposed upon a hack saw blade when in use and thereby eliminates the possibility of injury to the various parts of the combined mechanism, or bystanders, should breakage occur as by stripping of a stud or stripping of threads such that the control of the spring pressure is relieved and violent reaction of the spring permitted.

Other objects of the invention will in part be obvious and will in part appear hereinafter.

The invention accordingly comprises the features of construction, combinations of elements, and arrangement of parts, which will be exemplified in the construction hereinafter set forth, and the scope of the application of which will be indicated in the claim.

For a fuller understanding of the nature and objects of the invention reference should be had to the following detailed description taken in connection with the accompanying drawing, in which.

Figure 1:
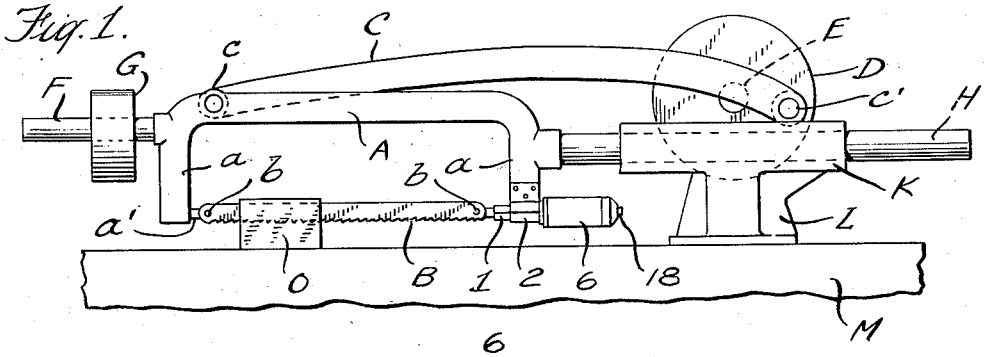
Fig. 1 is a side elevational view of a power hack saw showing the general relation of parts.
Figure 2:
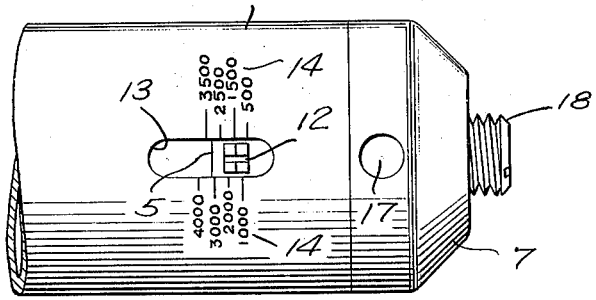
Fig. 2 is a view of one end of the tensioning device and gauge as it appears in top plan.
Figure 3:
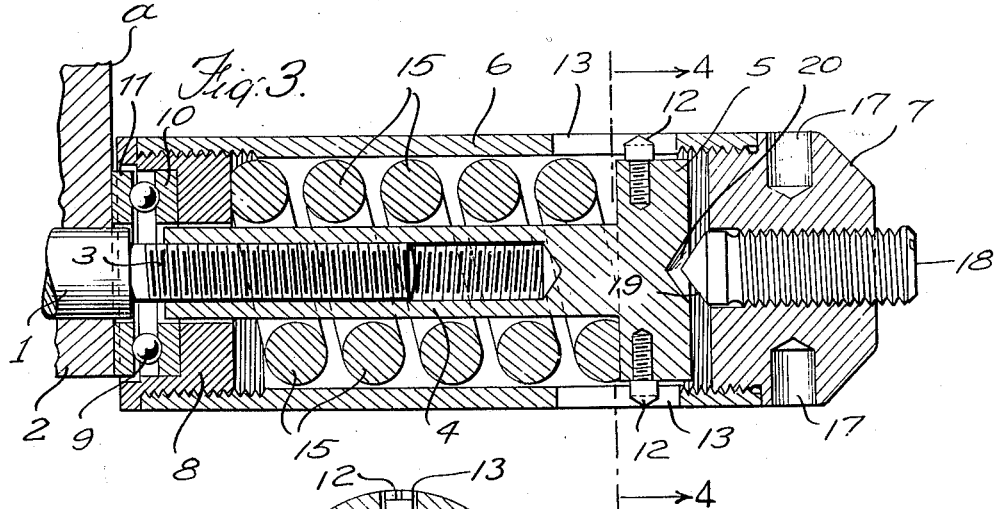
Fig. 3 is a section of the tension device and gauge showing means for preventing violent reaction of the tension spring in case of any breakage which would otherwise result in release and violent reaction of the spring.
Figure 4:
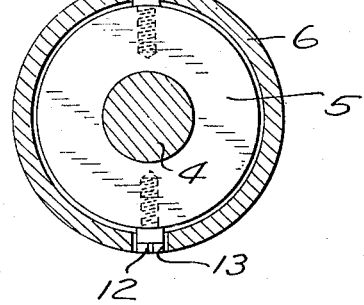
Fig. 4 is a cross-sectional view on the line 4—4 of Fig. 3.

As shown in Fig. 1 the general organization of a power hack saw machine includes a saw frame A which carries the saw blade B in a customary way between the two arms a, a. This saw frame may be reciprocated in any conventional manner as by the connecting rod C, pivoted at one end c to the saw frame A and at its other end c' to a rotating member D carried upon the shaft E and driven from any desired source of power.

Saw frame A carries upon a projecting stud F a weight G which when adjusted along the stud F adjusts the downward weight upon blade B. The saw frame carries at its other end a stud shaft H passing freely through a sleeve K carried by a support L upon the frame M. The work or work carrier is indicated at O.

Saw blade B is pierced at its ends with holes through which pass studs b, b at each end for mounting it in the ordinary and conventional way between a fixed stud a' carried by left-hand arm a and stud I which passes freely through a sleeve 2 in the lower end of the right-hand saw frame arm a. Stud I is threaded at its outer end as at 3 and this threaded end cooperates with an internally threaded sleeve 4, projecting inwardly from flanged member 5 which is carried so as to be freely reciprocable within the outer enclosing tube 6. This outer enclosing tube 6 carries at its outer end a head flange 7 and at its inner end a clamp flange 8, within which is carried anti-friction balls 9 between the ball race 10 on the clamp and a corresponding ball race on a ring 11 carried by the arm a. The member 5 is provided with two indicator studs 12 threaded into diametrically opposite sockets on the member 5 and projecting out through openings 13 on opposite faces of the tube 6. Tube 6 carries, associated with each of the studs 12, scale readings 14.

Surrounding sleeve 4 and carried between the flange of member 5 and inner clamp flange 8 is spiral spring 15. Screwed into the outer end of tube 6 is head flange 7 provided with wrench holes 17, and tapped centrally through the center of this head flange is safety adjusting screw 18 which as shown has a conical inner end at 19 cooperating for purposes of centering with a cone-shaped cut-out 20 in the outer face of the member 5.

In operation any desired tension may be placed upon the saw blade B by turning the tube 6, manually, or by any suitable wrench or other appliances, as by a turning device inserted into the holes 17. It will be noted that the rotation of the tube 6 carries with it the indicator studs 12 and member 5 and accordingly increases or decreases the tension of spring 15 depending on the direction of rotation.

The amount of adjustment of the blade is indicated by the scales 14 which may read in pounds or otherwise as desired, and the provision of scales on two faces of the device with an indicator stud for each is an advantage in that it facilitates the reading of the scale at whatever position the enclosing tube 6 is rotated.

When the saw blade B is given the desired tension as determined by the scale reading, the screw 18 is advanced to a point such that there is only a small clearance between it and the member 5. This clearance is enough to allow for expansion of the saw or pin hole stretching but not enough to cause the tensioning device to bounce from the machine or otherwise become displaced should the stud break or a stud strip, the result of which otherwise might be to cause injury to parts of the machine and to bystanders.

The various functions of this device are, as will be seen, accomplished by the use of few parts, easily manufactured, readily assembled and disassembled, and easily and readily adjusted to whatever operating and safety position may be desired.

With the construction shown, when it is desired to change a blade it is only necessary to unscrew the tube 6 about one turn and the blade tension is removed. The blade may then be changed and as the spring 15 is held compressed by the set screw 18 it is only necessary to tighten it again about one revolution and the full load is transferred from the screw 18 to tensioning the blade.

The rotation of the tube 6 is rendered more easy by the ball thrust bearings 9 which are especially useful when tensioning heavy blades which require tensioning of two thousand pounds and higher.

It will thus be seen that I have in the construction shown provided a simple, easily assembled, easily operated and efficient device for imposing any desired spring tension upon the saw blade while at the same time eliminating the liability to damage caused by breakage or stripping of any of the parts, which would permit violent reaction of the tensioning spring in the absence of means for limiting such reaction.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

In a hack saw blade tensioning device, a frame, a blade carried thereby, a reciprocable stud connected to the blade at one end, said stud being slidably received in one end of the saw frame and being threaded at its free end, a tube enclosing the threaded end of the stud and abutting the saw frame, a member reciprocable to a limited extent within said tube and carrying a sleeve threaded upon said stud, a spring within the enclosing tube abutting the end of the tube adjacent the frame and the reciprocable member, an indicator stud carried by said reciprocable member projecting through an opening in said tube, a scale inscription upon said tube showing the extent of movement of said indicator stud, a flange screwed into the outer end of said tube, and an adjusting screw tapped centrally and axially through said flange and acting to limit the outward movement of said reciprocable member.

WILLIAM H. SHORTELL.

REFERENCES CITED

The following references are of record in the file of this patent:

UNITED STATES PATENTS

| Number | Name | Date |
|---|---|---|
| 468,653 | Geitz | Feb. 9, 1892 |
| 703,713 | Smith et al. | July 1, 1902 |

FOREIGN PATENTS

| Number | Country | Date |
|---|---|---|
| 191,105 | Great Britain | Jan. 1, 1923 |